(No Model.)
F. E. JEANJAQUET.
COLTER CLEANER.
No. 288,442. Patented Nov. 13, 1883.
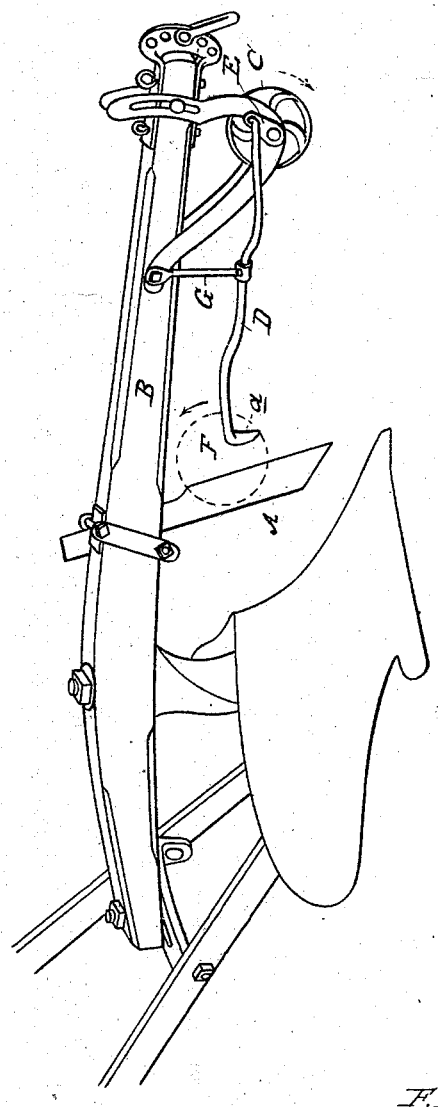
Attest:
E. Scully
Richard Morrow
Inventor:
F. Eugène Jeanjaquet
by his Att'y, A. Barthel

United States Patent Office.

F. EUGÈNE JEANJAQUET, OF DETROIT, MICHIGAN, ASSIGNOR OF ONE-HALF TO JOHN F. GUILLOZ, OF SAME PLACE.

COLTER-CLEANER.

SPECIFICATION forming part of Letters Patent No. 288,442, dated November 13, 1883.

Application filed May 15, 1883. (No model.)

*To all whom it may concern:*

Be it known that I, F. EUGÈNE JEANJAQUET, of Detroit, in the county of Wayne and State of Michigan, have invented an Improvement in Colter-Cleaners, of which the following is a specification.

The invention forms an attachment to plows, and its object is to free the colter of plows mechanically from stubble, roots, or weeds which may collect thereon during plowing; and my improvement consists in the construction and arrangement of mechanical devices for obtaining the desired result, all as more fully hereinafter described, and specifically set forth in the claims. Various devices have been designed for a similar purpose, and the gist of the present invention is a device which shall be inexpensive of manufacture, simple and direct in operation, and durable and efficient in service.

In the drawing which accompanies this specification my improvement is shown in a single figure as applied to the colter of an ordinary beam-plow, in which A is the colter, B the plow-beam, and C the plow-wheel. D is a pitman-rod pivotally secured at one end by a wrist to a crank, E, which latter is secured to the shaft of the plow-wheel and actuated thereby. F is the other end of the pitman. It is curved downward, as shown, so as to form a flat rake-tooth or hook, the forward edge, *a*, of which may be provided with a cutting-edge. G is a link pivotally connected at one end to the plow-beam and at the other to the pitman about midway of its length.

In practice the parts are so arranged that the rotation of the plow-wheel will actuate the crank and give to the pitman a reciprocating motion, which, on account of the link-connection G, forces the hook F to travel in an orbit. During a part of its orbital path the hook is brought into contact with the side of the colter and behind its cutting-edge, so that any obstructions upon the latter will be seized by the hook, and either cut or torn or drawn forward in the further travel of the hook, which releases them again on its retrograding movement. As the hook acts only on one side of the colter, its tendency in removing the obstructions from the same is naturally to shove the same sidewise, aiding them thereby to pass the colter, if they do not submit to the tearing or cutting action of the hook. The tendency of the hook to displace the obstructions upon the cutting-edge of the colter is generally alone sufficient to keep the colter free, and the hook may therefore have a blunt edge without affecting its usefulness in most instances. Instead of a single hook, a double hook acting on each side of the colter may be used to advantage in some instances. Its most suitable form, however, depends in a large degree upon the nature of the obstructions liable to be met with.

I am aware of the Patent No. 132,859, and make no claim to anything shown therein.

I attach importance to the link arranged to suspend the pitman approximately between the plow-wheel and the colter, upon which the hook operates, which link, moving with the pitman, gives a direct and orbitary motion to said pitman and an orbital path to the hook.

What I claim as my invention is—

The colter-cleaner herein described, consisting of the pitman D, pivotally suspended at or near its center by link G to the beam B, and connected loosely at one end to the crank F on the shaft of the wheel C, and having a hook at the opposite end, which in its orbital path passes in rear of the front edge of the colter to clean the same from weeds, &c., the said link serving to hold the pitman in an approximately horizontal position between the wheel C and colter, and the whole combined and adapted to serve as and for the purposes set forth.

F. EUGÈNE JEANJAQUET.

Witnesses:
  JOHN F. GUILLOZ,
  E. H. BARTHEL.